United States Patent [19]
Hightower

[11] 3,767,128
[45] Oct. 23, 1973

[54] COIL WINDING MACHINE
[76] Inventor: Clement G. Hightower, 17 Chagnon Ln., Pelham, N.H. 03076
[22] Filed: May 3, 1971
[21] Appl. No.: 139,534

[52] U.S. Cl. ............................ 242/7.05 B, 140/92.1
[51] Int. Cl. ............................................ H02k 15/09
[58] Field of Search ...................... 242/7.05 B, 7.14, 242/2, 3, 82, ; 140/92.1

[56] References Cited
UNITED STATES PATENTS

| | | | |
|---|---|---|---|
| 3,106,351 | 10/1963 | Fulton | 242/7.14 |
| 3,156,268 | 11/1964 | Moore | 242/7.05 B X |
| 3,101,180 | 8/1963 | Sadorf | 242/7.14 X |
| 3,222,000 | 12/1965 | White | 242/7.14 |

Primary Examiner—Billy S. Taylor
Attorney—Harold A. Murphy, Joseph D. Pannone and Edgar O. Rost

[57] ABSTRACT

A coil winding machine comprising a plurality of winding heads disposed in spaced relationship with one another, a work holder having means for supporting a workpiece in operative relationship with the winding heads, and control means for oscillatingly moving the workpiece back and forth between selected ones of the winding heads during the winding operation.

4 Claims, 6 Drawing Figures

PATENTED OCT 23 1973 3,767,128

COIL WINDING MACHINE

BACKGROUND OF THE INVENTION

The invention herein described was made in the course of and under a contract, or subcontract thereunder, with the Department of Defense.

This invention is related generally to machines for winding filamentary strands of material and is concerned more particularly with a machine for winding wire on a corepiece of an electric motor.

A stator, in one type of miniature synchronous motor, comprises a metallic drum having an annular series of equally spaced slots extending longitudinally in its outer cylindrical surface. Interposed between the slots are radially projecting portions of the drum which constitute the pole pieces of the stator. The stator pole pieces or uniform combinations of adjacent pole pieces are encircled by respective coils of wire to produce a symmetrical series of angularly spaced, magnetic poles. Generally, a plurality of such coils are connected in electrical series to form a winding which conducts current in the proper direction through the coils. Usually, alternate coils of a winding are wound clockwise relative to the encircled pole pieces and the other coils of the winding are wound counterclockwise. Thus, a circular array of alternate north and south magnetic poles is produced when a current flows in either direction through the winding.

In a synchronous motor, uniform groups of interconnected stator coils form a system of multiple windings, one for each phase of a polyphase alternating current. The coils of each winding are symmetrically disposed about the stator such that the respective windings produce similar arrays of alternate north and south poles. However, corresponding poles of the respective arrays are angularly spaced apart due to the relative positions of the associated coils on the stator. Consequently, when a polyphase alternating current flows through the stator windings, a rotating magnetic field is established which causes the surrounding rotor to rotate about the stator at the desired speed.

When manufacturing relatively large synchronous motors, the stator coils may be separately wound and then placed around respective pole pieces of a stator. When assembled as described, the preselected coils of a group may be joined to form a respective winding by means of electrical connections made at the ends of the stator. However, the resulting wire build-up at opposite ends of the drum-like stator is unsuitable for the relatively small casings which enclose miniature synchronous motors. Therefore, when fabricating relatively small synchronous motors, it has been found advantageous to wind the stator coils directly onto the pole pieces and to form these coils as integral portions of associated continuous windings. Thus, in a two-phase synchronous motor, for example, half of the total number of stator coils will constitute integral portions of one continuous winding, even though alternate coils are wound clockwise and the intervening coils are wound counterclockwise. Similarly, the other half of the total number of stator coils will constitute integral portions of another continuous winding.

Prior art winding machines commonly used for winding stators of the described type, generally, are provided with single winding heads. Consequently, in order to form the coils of each polyphase winding as integral portions thereof, one entire winding must be completed by such a machine before another can be started. As a result, coil portions of the second winding cross and overlay coil portions of the first winding at the respective ends of the stator. Thus, there occurs at each end of the stator an undesirable wire buildup which increases in magnitude when a third winding is required, such as in a three-phase sychronous motor, for example.

The problem of wire build-up at the ends of the stator may be avoided by utilizing a lap type of drum winding, which is described on Page 150, Volume 8 of the Encyclopedia Britannica, 1959 Edition. Coil portions at respective ends of a lap wound stator are disposed in substantially side by side slanting relationship, much like that of a wire braid, for example. This lap type of winding is produced by winding the poles of the stator in rotational succession, that is, as they occur when the stator is rotated steadily in a clockwise or counterclockwise direction. Consequently, corresponding coils in the respective polyphase windings must be formed sequentially before returning to the first winding to form the succeeding, oppositely wound coil therein. This procedure is repeated until the stator is fully wound. Thus, all the polyphase windings are completed during the same winding operation.

In order to achieve this objective, the stator must be supported in such a manner that it is uniformly accessible to a plurality of continuous wires during the same winding operation. Furthermore, the coils formed in the respective continuous wires must be maintained as integral portions thereof during the entire winding operation. Moreover, means must be provided for independently winding each of the continuous wires in either the clockwise or the counterclockwise directions about preselected pole pieces on the stator, while preventing the respective wires from becoming entangled with one another during the winding operation.

SUMMARY OF THE INVENTION

Accordingly, the foregoing objectives are achieved by the coil winding machine of this invention which machine comprises a plurality of wire winding heads symmetrically disposed and angularly spaced apart on the perimeter of an imaginary circle which is centered around a rotatably supported work holder. Each winding head comprises a rotatable wheel having a continuous wire feeding axially through a tube eccentrically disposed on the wheel and extending perpendicularly outward therefrom. The work holder comprises an elongated plate having in one end portion thereof a circular aperture which is disposed in the plane of the work holder and having a peripheral portion thereof intersected by a chordal slot disposed in the adjacent end surface of the work holder. The respective side surfaces of the work holder, adjacent the chordal opening, taper inwardly from the normal width dimension of the work holder toward the respective edges of the slot. Disposed in the aperture of the work holder is a work piece which may comprise a stator including a metallic drum having extending longitudinally in its outer cylindrical surface an annular series of angularly spaced slots and, interposed between the slots, an alternate series of pole pieces. The stator is inserted in the aperture of the work piece such that the outer cylindrical surface of the stator drum slidably engages the peripheral wall of the aperture. Thus, a predetermined number of poles are disposed in the chordal opening of the aperture. A wire guide having convolutions which conform with the slots to be wound is inserted into said slots and the work holder is rotated such that these slots are positioned in opposing relationship with a winding head. Consequently, the tapered side surfaces of the work holder extend through a perpendicularly disposed, imaginary plane which just grazes the distal end of the tube eccentrically disposed on the rotatable wheel of the winding head. The free end of the wire extending out of the tube is placed in one of the slots to be wound and the winding head is activated. As the winding head rotates, wire feeds out of the tube and loops around the tapered surfaces of the work holder. Each loop slides along the tapered surfaces to the wire guide which directs portions of the loop into respective slots. When the coil is finished, the wire remains attached to the winding head while the work piece is rotated in the aperture of the work holder to position other pole pieces in the chordal opening of the aperture. Then the work holder may be rotated to position the work piece opposite another winding head. In this manner, a lap wound stator is produced with coils constituting integral portions of respective continuous windings.

BRIEF DESCRIPTION OF THE DRAWING

For a better understanding of this invention, reference is made to the accompanying drawing wherein.

DESCRIPTION OF THE PREFERRED EMBODIMENT

Figure 1:
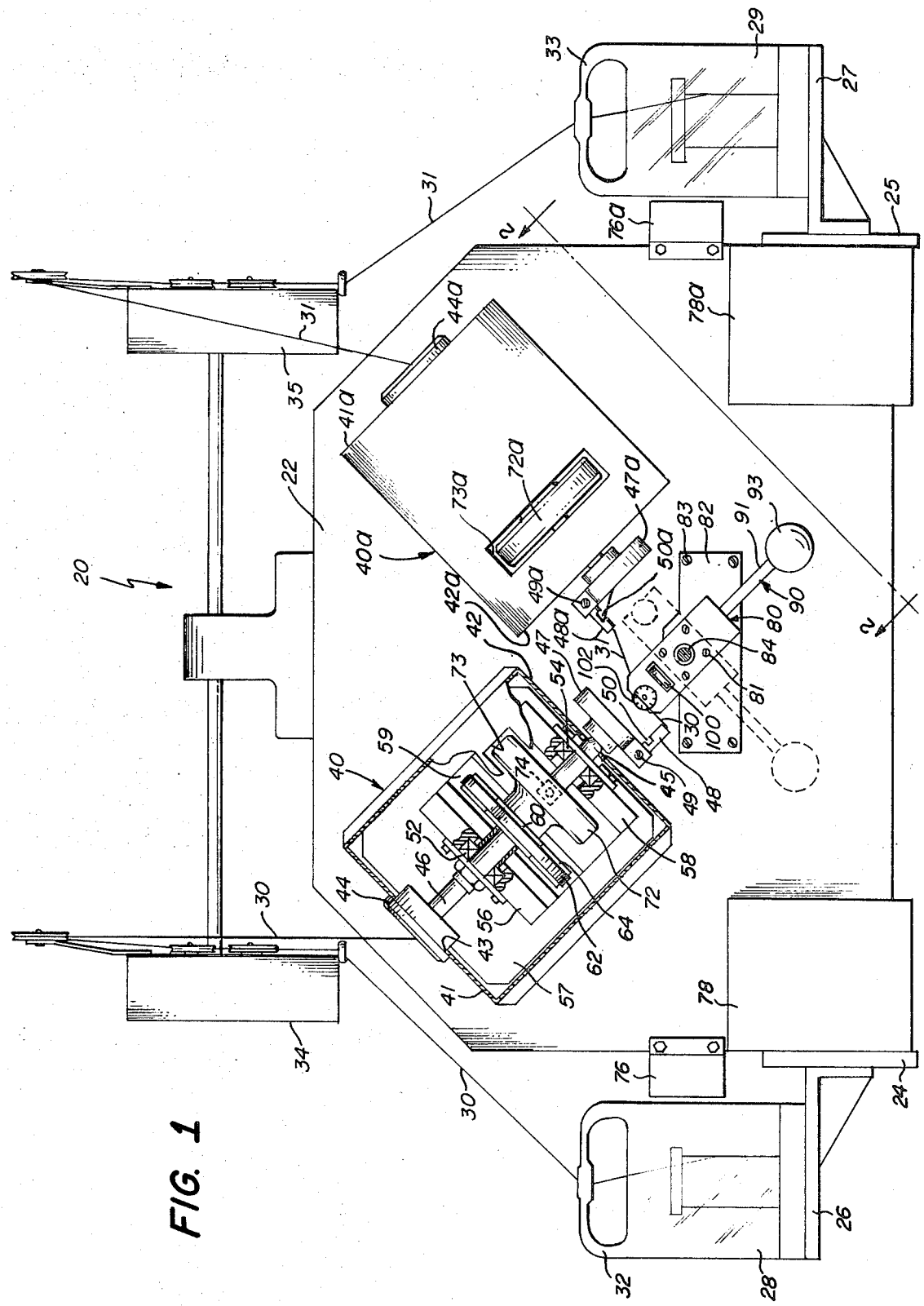
FIG. 1 is an elevational view, partly in axial section, of the coil winding machine of this invention.
Figure 2:
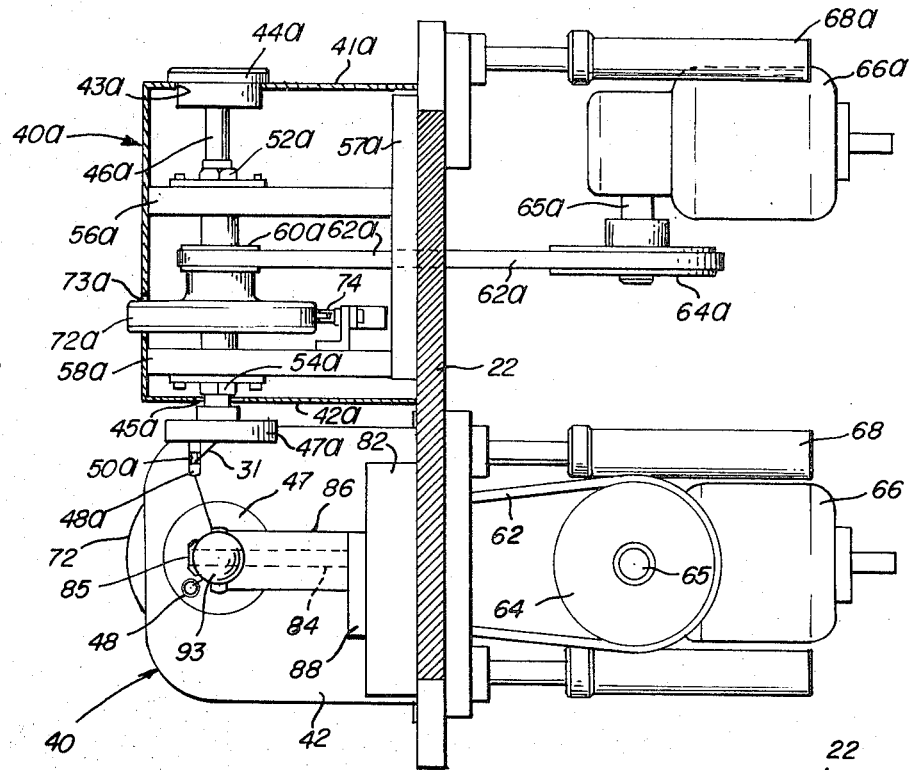
FIG. 2 is a transverse sectional view taken along the line 2—2 shown in FIG. 1 and looking in the direction of the arrows.

Referring more particularly to the drawing wherein like characters of reference designate like parts throughout the several views, there is shown in FIGS. 1 and 2 a coil winding machine 20 including a support plate 22 which is made of rigid material, such as aluminum, for example. Plate 22, preferably, is supported in an upright position by suitable means, such as triangular-shaped plates 24 and 25, respectively, for example, which are fixedly attached to respective opposing end surfaces of the plate 22. Secured to the outer surface of each plate 24 and 25 is respective angle bracket 26 and 27 which supports a respective cup-shaped container 28 and 29 having therein a suitably disposed spool carrying wires 30 and 31, respectively.

The containers 28 and 29, preferably, are made of transparent plastic material, such as polymerized methyl methacrylate, for example, and are provided with respective handles 32 and 33 which extend arcuately across the openings of the associated containers. Each of the handles 32 and 33 is provided with a centrally disposed aperture (not shown) through which the wires, 30 and 31, respectively, are drawn from the associated containers to respective overhead wire-tensioning devices 34 and 35. These wire tensioning devices are of the conventional type which may be obtained commercially, such as the Meteor AG, ME484 Dereeler type sold by Armacoil Machinery, New Rochelle, New York, for example. The tensioning devices 34 and 35 are supported, in cantilever fashion, over respective adjacent ends 41 and 41a of housings 40 and 40a, respectively. Each of the wire tensioning devices 34 and 35 maintains a preselected uniform tension on the engaged wire, 30 and 31, respectively, as it feeds the wire toward the adjacent end of the housing, 40 and 40a respectively.

Each of the housings 40 and 40a comprises a half-cylindrical, hollow casing which may be made of sheet metal, such as stainless steel, for example, and has opposing closed ends 41, 42 and 41a, 42a, respectively. The housings 40 and 40a are mounted on plate 22 in spaced, substantially perpendicular relationship with one another such that the respective closed ends 42 and 42a of the housings are disposed in predetermined spaced angular relationship with one another. The housings 40 and 40a enclose respective rotatable wire guiding means which are identical to one another in structural detail and function. Therefore, only the parts enclosed within the housing 40 and auxiliary parts connected thereto will be described in detail herein. However, it is to be understood that equivalent structural parts are enclosed within the housing 40a and have equivalent auxiliary parts connected thereto. Accordingly, these equivalent parts and the corresponding described parts have been designated herein with similar characters of reference, except a suffix "a" has been added to characters of reference designating the equivalent parts.

Figure 3:
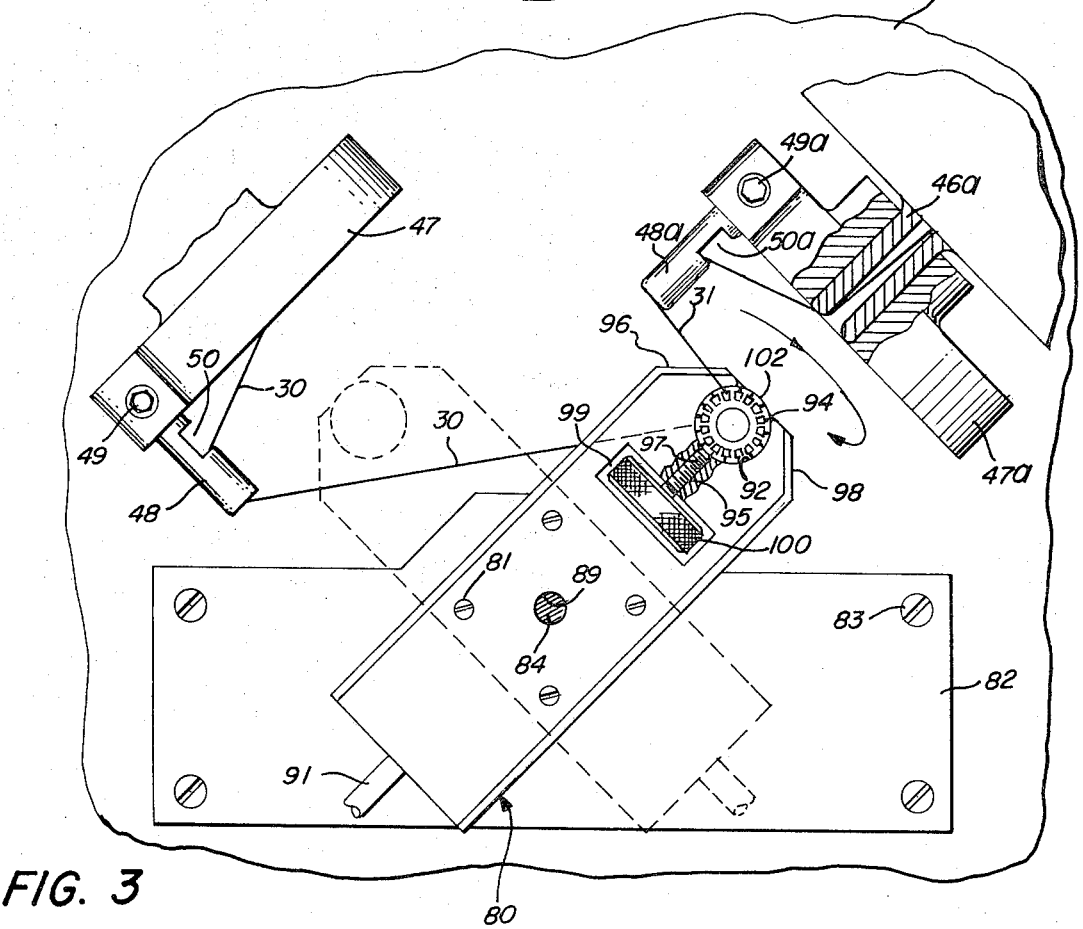
FIG. 3 is an enlarged, fragmentary view, partly in axial section, of the winding heads and work holder shown in FIG. 1.

The closed end 41 of housing 40 is provided with an aperture 43 into which is mounted, as by press-fitting, for example, a bushing 44 made of smooth dielectric material, such as polytetrafluorethylene, for example. Slidably disposed in the bore of bushing 44 is an end portion of a tube 46 which is made of rigid material, such as stainless steel, for example, and is disposed axially within the housing 40. The opposing end portion of tube 46 extends through an oversized aperture 45 in the closed end 42 of housing 40 and has a reduced diameter external portion which is fixedly attached to the hub of a wheel 47. Provided in the outer surface of wheel 47, adjacent a notched portion of the rim, is a shallow cavity (not shown) wherein one end of a rigid tube 48 is secured by suitable means, such as set screw 49, for example. Thus, tube 48 is eccentrically disposed on the outer surface of wheel 47 and extends perpendicularly outward therefrom. The wall of tube 48 is provided with a transversely extending hole 50 which communicates with the axial bore of tube 48. In practice, the tube 48 is rotated until the hole 50 is aligned with the hub of wheel 47 and then screw 49 is tightened to hold it in place. Subsequently, the wire 32 feeding from the tensioning device 34 is passed through the bushing 44, tube 46, the hub of wheel 47 and is threaded through the hole 50 to emerge from the axial bore of tube 48 (FIG. 3).

Within the housing 40, the tube 46 is rotatably supported in spaced bearings 52 and 54, respectively, which are mounted in respective plates 56 and 58. The plates 56 and 58 are perpendicularly disposed with respect to support plate 22 and are fixedly attached thereto by means of an intermediate base plate 57. Disposed in the base plate 57 and support plate 22 is a slot 59 which is aligned with a pulley 60 carried on the tube 46. The pulley 60 is rotatably engaged by a continuous belt 62 which passes through the slot 59 and, on the opposite side of plate 22, is similarly engaged by another pulley 64 (FIG. 2). The pulley 64 is rotatably connected, through an axially disposed shaft 65, to the shaft of an electric motor 66 which is mounted on the adjacent surface of plate 22 by suitable means, such as support bracket 68, for example. Thus, when energized, motor 66 rotates shaft 65 and pulley 64 which, in turn, causes the belt 62 to rotate pulley 60 and tube 46.

Also carried on tube 46 is an eccentric idler 72 which has a peripheral portion thereof protruding through a slot 73 in the housing 40 whereby the tube 46 and attached wheel 47 may be rotated by hand when the motor 66 is not energized. Once each revolution, the idler 72 activates a microswitch 74 mounted on the plate 58 thereby intermittently energizing, at regular intervals, a counting device 76 which is fixedly attached to the adjacent side of plate 22 and to which switch 74 is connected. The counting device 76 is of the conventional type which may be obtained commercially, such as the Predetermined Counter type sold by Veeder-Root, Hartford, Connecticut, for example. Counting devices of this type are operated by electrical pulses and allow the user to select a predetermined number of revolutions to be counted before an internal switch closes.

Mounted on plate 22 adjacent the counting device 76 is a motor controller 78 of the conventional type, such as the No. S10-10 type sold by G. K. Heller Co., Bellerose, New York, for example. Motor controllers of this type usually include conventional electrical components, such as an "ON-OFF" switch, fuse, ready light, speed controller, and a "FORWARD-REVERSE" switch, for examples. Usually, the "ON-OFF" switch activates the motor 66. However, the energizing circuit for motor 66 generally is connected in series with the contacts of a circuit breaker (not shown), which is controlled by the internal switch in the counting device 76. Thus, when the tube 46 and eccentric idler 72 have been rotated the preselected number of revolutions, the counting device 76 actuates the circuit breaker thereby deenergizing the motor 66. Generally, a "RESET" button is provided on the counting device 76 for closing the circuit breaker whereby the motor 66 may again be operated by the "ON-OFF" switch in the motor controller 78. The direction of rotation and speed of rotation are selected by operating the appropriate control devices in the motor controller 78.

As shown in FIGS. 1-3, the respective wheels 47 and 47a are symmetrically disposed relative to a centrally located work holder 80. The supporting structure for the work holder 80 comprises a base plate 82 which is disposed parallel with the support plate 12 and fixedly attached thereto by conventional means, such as screws 83, for example. Extending perpendicularly from the exposed flat surface of base plate 82 and having one end fixedly attached thereto is a center post 84 comprising a rod of rigid material, such as stainless steel, for example. The center post 84, thus disposed, has its axial centerline on the intersection of the axial center lines of wheels 47 and 47a, respectively. Rotatably disposed on the post 84 is a spacer block 86 provided with an axial bore having a cylindrical wall which slidably engages the center post 84. Fixedly attached to the end surface of block 86 adjacent the base plate 84 (FIG. 2) is a detent plate 88 carrying a spring loaded ball (not shown) which engages suitably located cavities in the adjacent surface of base plate 82 in the well-known manner.

Fixedly attached to opposing end surface of block 86, as by screws 81, for example, is a radially extending work holder 80. The work holder 80 comprises an oblong plate of rigid material, such as aluminum, for example, having therein a centrally disposed aperture 89 which is aligned with the axial bore in block 86. A protruding end of center post 84 is threadingly engaged by a nut 85 (FIG. 2) which presses the detent plate 88 against the adjacent surface of base plate 82. Fixedly attached to one end of the work holder 80 is a suitable handle 90, such as axially extending rod 91 and attached knob 93, for example, whereby the work holder 80 and block 86 may be rotated about the center post 84. The opposing end portion of work holder 80 is provided with a circular aperture 92 disposed in the plane of the work holder and having a peripheral portion thereof intersected by a chordal opening 94 which is centrally disposed in the adjacent end surface of the work holder. On opposing sides of the aperture 92, the respective side surfaces 96 and 98 of the work holder taper inward from the normal width of the work holder to merge with the respective opposing edges of the opening 94. Disposed in the periphery of the aperture 92 opposite the chordal opening 94 is one end of an axially extending bore 95 having journalled therein a threaded shaft 97 made of plastic material, such as polytetrafluroethylene, for example. The other end of bore 95 terminates in a transversely extending slot 99 having knurled knob 100 rotatably disposed therein, which knob is fixedly attached to the adjacent end of the threaded shaft 97.

Figure 4:
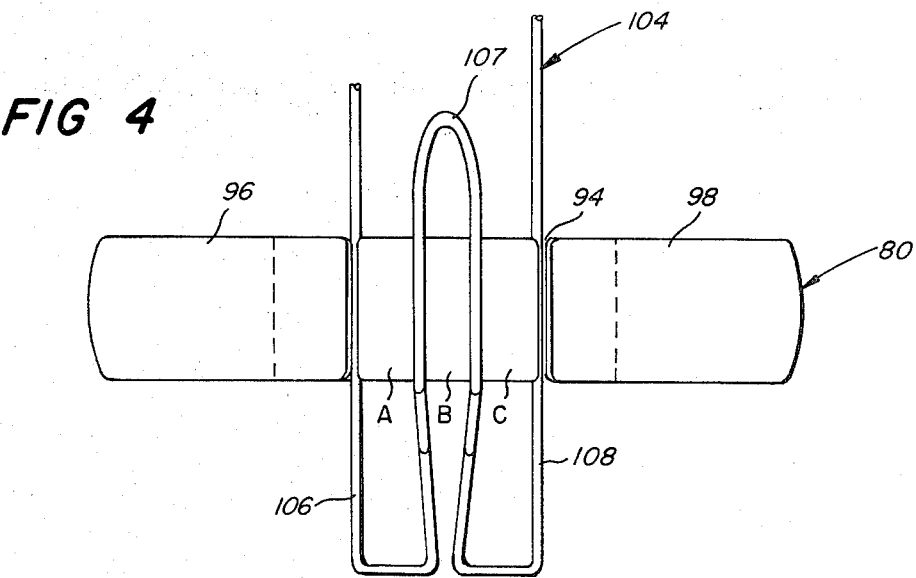
FIG. 4 is a side elevational view of a stator as mounted in the work holder shown in FIG. 5.
Figure 5:
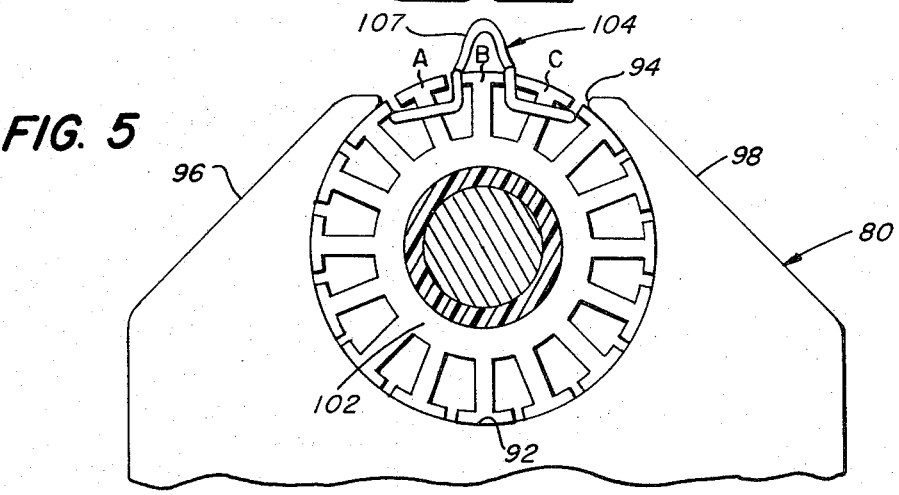
FIG. 5 is a top plan view of the stator as mounted in the work holder of this invention.

In operation, a workpiece, such as the stator 102 shown in FIGS. 4 and 5, for example, is inserted into the aperture 92 of work holder 80. The stator 102 includes a metallic drum having extending longitudinally in its outer cylindrical surface an annular series of angularly spaced slots and alternately interposed pole pieces. By way of illustration, the stator 102 shown in FIG. 5 is provided with 16 slots, numbered 1 to 16, respectively, and 16 pole pieces, lettered A to P, respectively. This stator 102 is inserted into the aperture 92 of the work holder 80 such that the outer cylindrical surface of the stator drum slidably engages the peripheral wall of the aperture. The knurled knob 100 is rotated until the distal end of the attached shaft 97 just bears against the stator 102. When the stator is disposed as described, four spaced slots, such as slots 1-4, respectively, for example, and three alternatly interposed pole pieces A-C, respectively, are disposed in the chordal opening 94. Thus, the width of the chordal opening 94 determines the number of pole pieces exposed for winding a coil thereon.

Inserted into slots 1 and 4 are respective portions of a wire guide 104 which is made of resilient wire material and has convolutions therein which engage portions of the stator 102 exposed in the opening 94. As shown in FIG. 4, the wire guide 104 may be provided with a configuration similar to that of a paper clip, for example, having straight, parallel legs 106 and 108, respectively, which are integrally joined to one another by an intermediate leg 107 having a return loop therein. The legs 106 and 108 are disposed in slots 1 and 4, respectively, in such a manner that opposing end portions of the respective legs extend out of opposing ends of the slots 1 and 4, respectively. The sides of the return loop in the intermediate leg 107 may be inserted into respective slots 2 and 3, for example, whereby sufficient friction is developed to hold the wire guide 104 in place during the winding process. Alternatively, if the material of the wire guide 104 has sufficient resiliency, the intermediate leg 107 thereof may exert sufficient spring tension against the exterior adjacent surface of pole piece B, for example, to hold the straight legs 106 and 108, respectively, firmly against interior surfaces of the associated slots, as shown in FIGS. 4 and 5.

Figure 6:
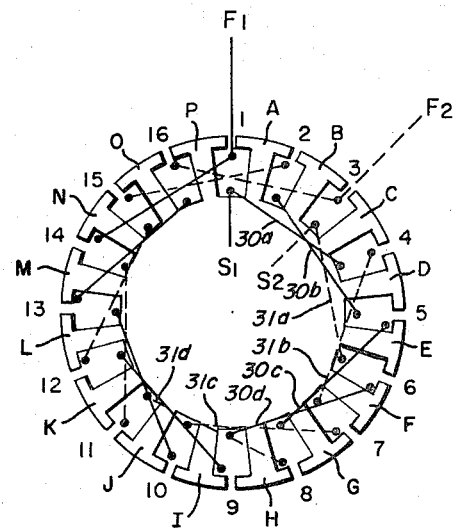
FIG. 6 is a lap wound stator as produced with the coil winding machine of this invention.

After the wire guide 104 is assembled as described, the work holder 80 is rotated about the center post 84 to bring the chordal opening 94 into spaced opposing relationship with a wheel, such as 47, for example. With the aid of an indexing device, such as detent plate 88, for example, the pole piece B and the intermediate leg 107 of the wire guide 104 may be located substantially coplanar with the hub of wheel 40. The free end of wire 30 extending from the distal end of tube 48 is laid in either slot 1 or slot 4 depending upon the expected rotational direction of wheel 40. The "FORWARD-REVERSE" switch in the motor controller 78 is adjusted accordingly and the "ON-OFF" switch is placed in the "ON" position. The resulting revolving movement of tube 48 around the wire guide 104 describes a cylinder wherein the tapered surfaces 96 and 98, respectively, of the work holder 80 protrude. As a result, the wire 30 paying out of the distal end of tube 48 is looped around the tapered surfaces 96 and 98, respectively and slides loosely along these surfaces until it reaches the straight legs 106 and 108, respectively. As the loop tightens around the wire guide 104, the wire forming the loop slides under the respective legs 106 and 108 and into the associated slots 1 and 4. Each loop, thus formed, constitutes a respective turn of a coil 30a which encircles the combination of pole pieces A, B and C, respectively, as shown in FIG. 6. From the foregoing, it may be seen that the work holder 80 must extend from the center post 84, as a cantilever arm, for example, a sufficient radial distance to position the chordal opening 94 within an imaginary, hollow cylinder described by the revolutions of tube 48 around the wire guide 104. As a result, the adjacent end portion of the work holder, including the tapered surfaces 96 and 98, respectively, will be disposed in a perpendicularly disposed imaginary plane which just grazes the distal end of tube 48.

After a preselected number of turns, such as thirty, for example, have been wound about the combination of pole pieces A, B and C, respectively, the counting device 76 deenergizes motor 66 thereby stopping the revolving movement of tube 48 about the wire guide 104. By means of knob 100, the shaft 99 is journalled away from the stator 102. Thus, while maintaining coil 30a as an integral portion of wire 30, the stator is rotated in aperture 92 an angular distance equal to one pole pitch, in the counterclockwise direction. As a result, slots 2–5, respectively and interposed pole pieces B-D, respectively, are positioned in the opening 94. After shaft 99 is tightened against stator 102, the described winding operation is repeated to form coil 30b which encircles the combination of pole pieces B, C and D, respectively. Thus, coil 30b is wound in the same rotational direction and has the same number of turns as coil 30a. Since the coils 30a and 30b, respectively, constitute integral portions of a phase winding produced from wire 30, the combination of pole pieces A-D, respectively, form one magnetic pole. The field established by this magnetic pole will have flux lines which are concentrated at the centrally located pole pieces B and C, respectively, since these pole pieces are shared in common by both coils, 30a and 30b, respectively. By utilizing two staggered coils, such as respective coils 30a and 30b, for example, to produce a magnetic pole instead of a single coil having twice as many turns, the wire buildup at the respective end surfaces of the stator 102 will be minimized, as shown in FIG. 6. Thus, it can be seen that wheel 47 and attached tube 48 constitute a winding head having means for producing a series of angularly spaced coils on the stator 102, each coil being maintained as a respective integral portion of a continuous winding.

After coil 30b is completed, the stator 102 is rotated in the aperture 92 an angular distance equal to one pole pitch, in the counterclockwise direction. As a result, slots 3–6, respectively, and interposed pole pieces C-E, respectively are positioned in the opening 94. The work holder 80 is rotated about the center post 84, while maintaining the respective coils 30a and 30b wound on stator 102 as integral portions of the continuous wire 30. By means of tensioning device 34, the portion of wire 30 extending between the stator 102 and the open end of tube 48 is maintained taut during rotation of the work holder 80. With the aid of detent plate 88, the opening 94 is positioned in spaced opposing relationship with the wheel 47a, such that the opening 94 is symmetrically disposed relative to the hub of wheel 47a. In a manner similar to that described for winding wire 30 to form coil 30a, the wire 31 is wound to form a coil 31a about the combination of pole pieces C, D and E, respectively. The revolving movement of tube 48a also describes a hollow cylinder wherein the chordal opening 94 must be positioned in order to have the wire 31 form successive loops around the tapered surfaces 94 and 96, respectively. Consequently, it is necessary that the work holder 80 extend as a cantilever arm, for example, a sufficient radial distance from the center post 84 to have the tapered surfaces 94 and 96 protruding through a perpendicularly disposed, imaginary plane which just grazes the distal end of tube 48a. As shown in FIGS. 1 and 3, because of the angular displacement of wheel 47a from the wheel 47, the continuous wire 30 will not become entangled with the continuous wire 31.

After coil 31a is completed, the stator 102 is rotated in the aperture 92 an angular distance equal to one pole pitch, in the counterclockwise direction, while maintaining coil 31a as an integral portion of wire 31. As a result, slots 4–7, respectively, and interposed pole pieces D-F, respectively, are positioned in the opening 94. In a manner similar to that described for winding wire 30 to form coil 30b, the wire 31 is wound to form a coil 31b about the combination of pole pieces D, E and F, respectively. Thus, coil 31b is wound in the same rotational direction and has the same number of turns as coil 31a. Since the coils 31a and 31b, respectively, constitute integral portions of a second phase winding, which is produced from wire 31, the combination of pole pieces C-F, respectively, form a second magnetic pole which is angularly displaced from the first magnetic pole by a predetermined number of electrical degrees, usually equal to the phase angle. Thus, it can be seen that wheel 47a and attached tube 48a also constitute a respective winding head having means for producing a series of angularly spaced coils on the stator 102, which coils are maintained as respective integral portions of a second continuous winding.

After coil 31b is completed, the work holder 80 is rotated about the center post 84, while maintaining the respective coils 31a and 31b as integral portions of the continuous wire 31. Since the tensioning devices 34 and 35, respectively, maintain taut the respective portions of wires 30 and 31 extending between the stator 102 and the tubes 48 and 48a, respectively, the wires 30 and 31 are prevented from becoming entangled with one another during rotation of the work holder 80. With the aid of detent plate 88 the chordal opening 94 is positioned again in spaced opposing relationship with the wheel 47. The procedure for forming coils 30a and 30b, respectively, as integral portions of wire 30 is repeated to form coil 30c around the combination of pole pieces E-G, respectively, the coil 30d around the combination of pole pieces F-H, respectively. However, the respective coils 30c and 30d are wound in the opposite rotational direction from that used to wind coils 30a and 30b, respectively. Therefore, the combination of pole pieces E-H, respectively, form a magnetic pole which is opposite, in a magnetic sense, to that formed by the combination of pole pieces A-D, respectively. Similarly, the chordal opening 94 is positioned in spaced opposing relationship with wheel 47a where coil 31c is formed around the combination of pole pieces G-I, respectively, and coil 31d is formed around the combination of pole pieces H-K, respectively. Similarly, the respective coils 31c and 31d are wound in the opposite rotational direction from that of coils 31a and 31b, respectively. Consequently, the combination of pole pieces G-K, respectively, form an opposite magnetic pole to that formed by the combination of pole pieces C-F, respectively.

Note in FIG. 6 that coil 31b extends from the outside of slot 4 to the inside of slot 7; coil 30c extends from the outside of slot 5 to the inside of slot 8; coil 30d extends from the outside of slot 6 to the inside of slot 9 and so on around the stator. As a result, the coils are disposed in side by side slanting relationship at respective ends of the stator and have an appearance similar to that of a wire braid. This type of winding is characteristic of lap type drum winding which is accomplished by the coil winding machine of this invention. In order to achieve this type of winding, the poles of the stator must be wound in rotational succession as they occur when the stator is rotated steadily in a clockwise or counterclockwise direction. Consequently, corresponding coils in the respective polyphase windings must be formed sequentially before returning to the first winding to form the succeeding, oppositely wound coil therein. Thus, all the polyphase windings must be completed during a single winding process, an objective which cannot be achieved with the single winding head machines of the prior art.

As stated previously, the axial center line of post 84 is disposed substantially on the intersection of the axial center lines of the respective wheels 47 and 47a. Also, it is necessary that the work holder 80 extend from the center post 84 a sufficient radial distance to position the chordal opening 94 within each of the imaginary, hollow cylinders described by the revolutions of respective tubes 48 and 48a about the hubs of respective wheels 47 and 47a. Consequently, the hubs of the wheels 47 and 47a, respectively, are positioned on respective angularly spaced portions of an imaginary circle having the post 84 at its center. Thus, when the chordal opening is positioned within the hollow cylinder associated with tube 48, for example, wire 31 extending from the tube 48a to the stator 102 disposed in the aperture 92, passes through the open end of the hollow cylinder associated with tube 48.

Thus, it can be seen that the coil winding machine of this invention may be used for winding other types of polyphase synchronous motors, such as a three phase synchronous motor, for example, by having the required number of winding heads angularly spaced apart around the perimeter of an imaginary circle which is centered around the rotatable support for work holder 80.

Accordingly, the loci of possible paths in which the wire 30 can extend from the stator 102 to the periphery of the imaginary cylinder associated with the tube 48 can best be described as frusto-conical, having a small diameter end encircling the stator 102 and a larger diameter end coinciding with the open end of the cylinder associated with tube 48. Also, the loci of possible paths in which wire 31 can extend from the stator 102 to the periphery of the imaginary cylinder associated with tube 48a can be best described as frusto-conical, having a small diameter end encircling the stator 102 and a larger diameter end coinciding with the open end of the cylinder associated with tube 48a. However, when the chordal opening 94 is disposed within the cylinder associated with tube 48, the frustum associated with wire 30 subtends a larger angle than the frustum associated with wire 31. Similarly, when the chordal opening 94 is disposed within the cylinder associated with tube 48a, the frustum associated with wire 31 subtends a larger angle than the frustum associated with wire 30. Consequently, the wires 30 and 31 do not become entangled with one another during the winding operation.

Thus, there has been disclosed herein a novel coil winding machine having means for supporting a work piece in such a manner that it is uniformly accessible to a plurality of continuous wires during the same winding operation. The coils formed by this machine are maintained as integral portions of respective continuous windings which are produced during the winding process. This machine also provides means for independently winding each of the continuous wires in either the clockwise or the counterclockwise direction, such that the wires do not become entangled with one another during the winding process. Although this machine has been illustrated herein as having means for winding the stator of a synchronous motor, it also may be used for winding other types of externally wound workpieces, such as the armature of a series or a shunt motor, for example.

From the foregoing, it will be apparent that all of the objectives of this invention have been achieved by the structures shown and described. It will be also apparent, however, that various changes may be made by those skilled in the art without departing from the spirit of the invention as expressed in the appended claims.

It is to be understood, therefore, that all matters shown and described is to be interpreted as illustrative and not in a limiting sense.

What is claimed is:

1. A machine for winding a plurality of continuous wires on a workpiece during a single winding operation, said machine comprising:

a support member;

an elongated member perpendicularly disposed with respect to the support member and having one end fixedly attached thereto;

a plurality of winding heads rotatably supported on the support member and angularly spaced apart on an arcuate perimeter having the elongated member at its center;

a work holder rotatably supported on said elongated member and having a cantilever arm portion extending radially outward therefrom, the unsupported end portion of the cantilever arm being disposed in operative spaced relationship with a preselected winding head;

said end portion having a substantially circular aperture therein in the plane of the arm and adjacent the end surface of said end portion, the peripheral wall of said aperture having therein a chordal opening which extends through the end surface of said end portion;

retaining means disposed in said end portion of the cantilever arm for securing the workpiece in operative spaced relationship with said preselected winding head;

means for oscillatingly rotating said end portion of the cantilever arm back and forth between selected ones of the winding heads during the winding operation; and wire guiding means for supplying a respective continuous wire to each of the winding heads.

2. A machine as set forth in claim 1 wherein a cylindrical workpiece is disposed in said circular opening and has a peripheral portion thereof protruding through said chordal opening.

3. A machine as set forth in claim 2 wherein the cylindrical workpiece comprises a metallic drum having an annular series of angularly spaced slots disposed longitudinally in the outer cylindrical surface thereof and interposed between the slots respective radially extending portions of the drum.

4. A machine for winding a plurality of continuous wires on a workpiece during a single winding operation, said machine comprising:

a support member;

a rigid post perpendicularly disposed with respect to the support member and fixedly attached thereto;

a plurality of winding heads rotatably supported on the member and angularly spaced apart on an arcuate perimeter having the post at its center;

each winding head including a rotatable wheel having an axial center line intersecting the axial centerline of the post and having a surface disposed in spaced opposing relationship therewith, and an eccentrically disposed tube fixedly attached in perpendicular relationship to said surface and having a hole extending transversely through the wall thereof;

rotatably supported tubes perpendicularly disposed relative to respective wheels, each tube having an end portion extending axially through the hub of the respective wheel and fixedly attached thereto;

controllable rotating means connected to respective rotatably supported tubes for rotating the attached wheel a predetermined number of revolutions during respective operational intervals;

a work holder rotatably mounted on the post and radially aligned with a preselected winding head;

the work holder including a cantilever arm extending radially outward from the post and having an end portion protruding through a perpendicularly disposed plane which just grazes the unsupported end of the eccentrically disposed tube;

said end portion of the centilever arm having disposed therein, in the plane of the arm, an aperture into which a workpiece is insertable and held in operative spaced relationship with the preselected winding head; and means connected to the cantilever arm for oscillatingly rotating the workpiece back and forth between selected ones of the winding head during the winding operation.

* * * * *